United States Patent
Kimura

(10) Patent No.: US 7,444,553 B2
(45) Date of Patent: Oct. 28, 2008

(54) TRACER, TRACER EMBEDDED PROCESSOR, AND METHOD FOR OPERATING THE TRACER

(75) Inventor: Katsuyuki Kimura, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 594 days.

(21) Appl. No.: 11/148,324

(22) Filed: Jun. 9, 2005

(65) Prior Publication Data

US 2005/0289399 A1 Dec. 29, 2005

(30) Foreign Application Priority Data

Jun. 29, 2004 (JP) ............... 2004-191658

(51) Int. Cl.
*G06F 11/00* (2006.01)
(52) U.S. Cl. ...................................... 714/45
(58) Field of Classification Search ................ 714/45, 714/25, 30, 31, 33, 34, 37–39
See application file for complete search history.

(56) References Cited

U.S. PATENT DOCUMENTS

| | | | | |
|---|---|---|---|---|
| 5,642,478 A | * | 6/1997 | Chen et al. ................... | 714/45 |
| 6,009,270 A | * | 12/1999 | Mann ......................... | 717/128 |
| 6,314,530 B1 | * | 11/2001 | Mann ......................... | 714/38 |
| 6,615,371 B2 | * | 9/2003 | McCullough et al. ......... | 714/45 |
| 6,732,307 B1 | | 5/2004 | Edwards | |
| 6,961,872 B2 | * | 11/2005 | Yamamoto et al. ............ | 714/34 |
| 7,058,859 B2 | * | 6/2006 | McCullough et al. ......... | 714/45 |
| 7,178,133 B1 | * | 2/2007 | Thekkath .................... | 717/128 |
| 7,308,681 B2 | * | 12/2007 | Ekanadham et al. ........ | 717/128 |
| 2005/0289400 A1 | * | 12/2005 | Kimura ....................... | 714/45 |

OTHER PUBLICATIONS

"EJTAG Trace Control Block Specification", MIPS Technologies, Document No. MD00148, Revision 1.04, Mar. 21, 2002, pp. 1-30 and 39-60.

* cited by examiner

*Primary Examiner*—Nadeem Iqbal
(74) *Attorney, Agent, or Firm*—Oblon, Spivak, McClelland, Maier & Neustadt, P.C.

(57) ABSTRACT

A tracer includes a trace memory that is stored with trace information of the program execution status of a processor; trace information compression unit that compresses the trace information into a predetermined trace format, and stores the resulting compressed information in the trace memory piece by piece cyclically; and an address register that stores the last stored address of the trace memory, analyzes the content of the trace memory in reverse order to a program executed order, searches for a start or end of the trace format, and carries out trace analysis therefrom in the program executed order.

20 Claims, 6 Drawing Sheets

FIG. 3

| | | | | | | | | FORMAT | BIT NUMBER |
|---|---|---|---|---|---|---|---|---|---|
| | | | | | | | 0 | DPF1 | 1 |
| | | | | | | 0 | 1 | DPF2 | 2 |
| | | | | 0 | 0 | 0 | 1 | 1 | DPF3 | 5 |
| | 18 BITS | | | 1 | 0 | 0 | 1 | 1 | DPF4 | 23 |
| 34 BITS | | | | 0 | 1 | 0 | 1 | 1 | DPF5 | 39 |
| | | | | 1 | 1 | 0 | 1 | 1 | DPF6 | 5 |
| | 16 BITS | 0 | 0 | 0 | 0 | 1 | 1 | 1 | DDF1 | 23 |
| 32 BITS | | 1 | 0 | 0 | 0 | 1 | 1 | 1 | DDF2 | 39 |
| | 8 BITS | 0 | 1 | 0 | 0 | 1 | 1 | 1 | DDF3 | 15 |
| 18 BITS | | 1 | 1 | 0 | 0 | 1 | 1 | 1 | DDF4 | 25 |
| 33 BITS | | 0 | 0 | 1 | 0 | 1 | 1 | 1 | DDF5 | 40 |
| 65 BITS | | 1 | 0 | 1 | 0 | 1 | 1 | 1 | DDF6 | 72 |

NUMBER OF EXECUTION CYCLES     TRACE INFORMATION TO BE CAPTURED

TRACER, TRACER EMBEDDED PROCESSOR, AND METHOD FOR OPERATING THE TRACER

CROSS REFERENCE TO RELATED APPLICATIONS AND INCORPORATION BY REFERENCE

This application is based upon and claims the benefit of priority from prior Japanese Patent Application P2004-191658 filed on Jun. 29, 2004; the entire contents of which are incorporated by reference herein.

BACKGROUND OF THE INVENTION

1. Field of the Invention

The present invention relates to a technology for generating and recording trace information of the program execution status of a processor. More specifically, it relates to a tracer, which effectively compresses and records trace information.

2. Description of the Related Art

Recent microprocessors have been required not only to provide a higher operating performance at a higher operating frequency, but also to support a decrease in the development time of a processor embedded system. In development of a processor or a processor embedded system, analysis of information (trace information) of the flow of a program executed by the processor and data update information is effective to decrease development time. Therefore, technologies including a processor capable of externally outputting trace information and an in-circuit emulator (ICE) or the like, which analyzes the execution of a program flow and updates data, based on the extracted trace information, have been developed and provided.

Development of higher-speed processors makes it difficult to capture a signal for trace analysis. Therefore, development of technologies for reducing the number of signals to be output in real time by compressing processor trace information, and development of technologies for storing trace information in a memory in real time, by providing memory in the processor, are being pursued. A method using a variable length trace storage format, which allows storage of as much trace information as possible in the internal memory of the processor, is well-known (See, "EJTAG TRACE CONTROL BLOCK SPECIFICATION", MIPS Technologies Inc. Document Number: MD00148, Revision 1.04, Mar. 21, 2002, P. 3-6, for example).

However, there is a disadvantage when storing trace information of this variable length trace storage format in a memory (trace memory). That is pieces of variable length data cannot be stored in that memory without leaving vacant areas in the memory. Consequently, useless data is inserted therebetween.

In other words, when using the variable length trace storage format, in order to analyze stored trace information, 4-bit information needed for finding the start address of trace information, which is stored in each word (64 bit) area of the trace memory, is typically stored in the lower bits [3:0]. Thus, 1/16 of the trace memory capacity cannot be used for storing trace information. Furthermore, the start addresses of respective pieces of trace information, each indicated by that 4-bit information, are at 4-bit intervals. Thus, when the end address of the immediately preceding trace information is not multiples of 4 minus 1, useless data is inserted, preventing storage of most of trace information in the memory.

SUMMARY OF THE INVENTION

An aspect of the present invention inheres in a tracer which includes: a trace memory configured to store trace information of the program execution status of a processor; a trace information compression unit configured to compress the trace information into a predetermined variable length trace format, and to store the resulting compressed information in the trace memory cyclically piece by piece; and an address register configured to store the last stored address of the trace memory.

Another aspect of the present invention inheres in a processor including a tracer which encompasses: a processor core module that includes a trace information output unit and reads in and executes processor instructions; a debug module that includes a JTAG debugger interface and a tracer, which includes: trace memory stored with trace information of the program execution status; a trace information compression unit, which compresses the trace information into a predetermined trace format and cyclically stores the resulting compressed trace information in the trace memory, piece by piece; and an address register, which stores the last stored address of the trace memory; and a bus connected between the processor core module and the debug module.

Another aspect of the present invention inheres in a method for operating a tracer which includes: outputting trace information from a trace information output unit of a processor core module, which has executed a program, and inputting the trace information to a trace information compression unit during a trace operation; compressing the trace information into a variable-length trace storage format and successively storing the resulting compressed trace information in a trace memory; and reading out content of the trace memory and the last stored address stored in an address register of the tracer by a JTAG debugger after completion of the trace operation, inputting an object/source code list of a program being executed by the processor core module to a trace analysis program storage unit of the JTAG debugger, and analyzing the content of the trace memory using a trace analysis program.

BRIEF DESCRIPTION OF THE DRAWINGS

FIG. 3 shows all trace formats;

DETAILED DESCRIPTION OF THE INVENTION

Figure 1:
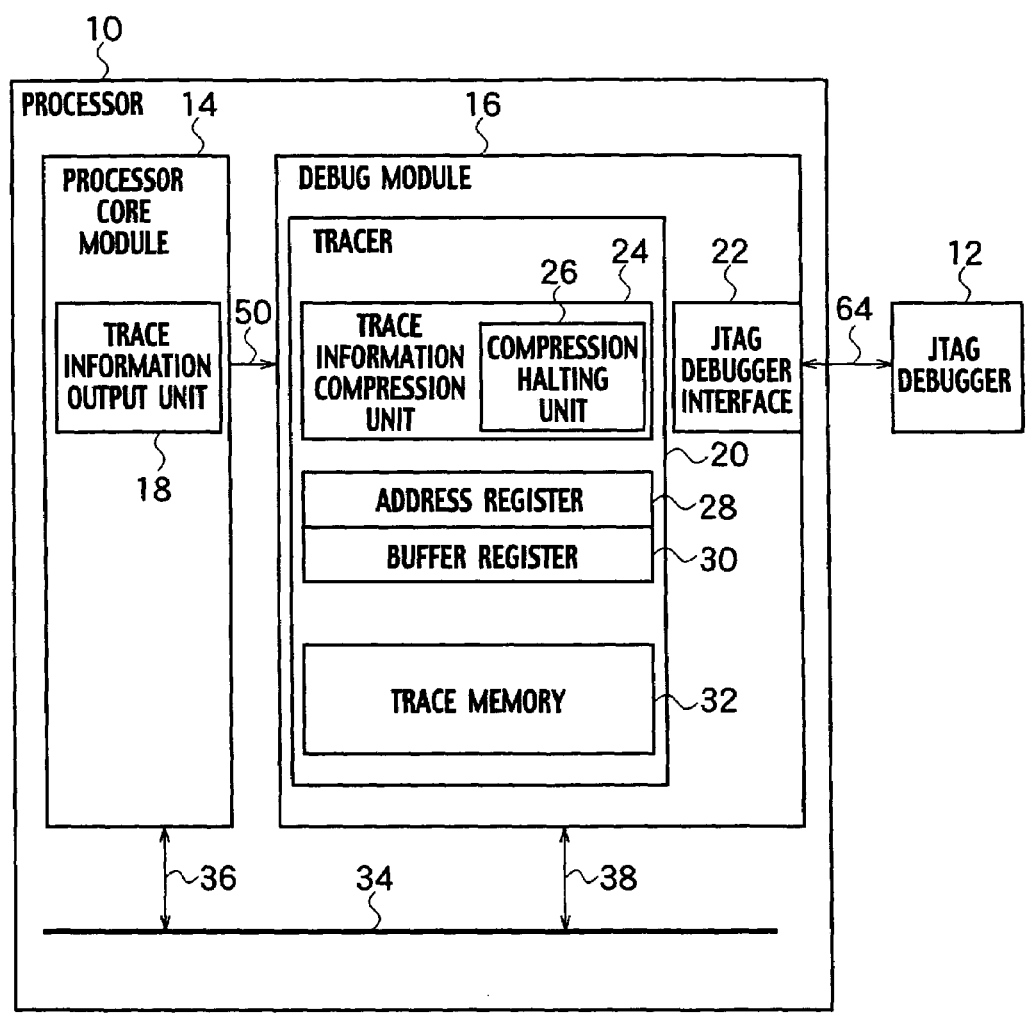
FIG. 1 is a schematic block diagram of a tracer embedded processor, according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The embodiments shown below exemplify an apparatus and a method that are used to implement the technical ideas according to the present invention, and do not limit the technical ideas according to the present invention to those that appear below. These technical ideas, according to the present invention, may receive a variety of modifications that fall within the claims.

The embodiments of the present invention are described forthwith while referencing the drawings. The same or similar symbols are given to the same or similar parts throughout the appended drawings. However, it should be noted that the drawings are merely schematics that thickness, planar dimensions or the like of each block in each data format may differ from reality. Furthermore, needless to say that parts with differing dimensions and/or differing ratios among the drawings may be included.

In addition, the embodiments given forthwith exemplifies devices and methods for embodying the technical ideas of the present invention, and those technical ideas are not limited to the following materials, shapes, structures, arrangements or the like. The technical ideas of the present invention may be modified into various modifications within the scope of the appended claims.

The present embodiment effectively compresses and records trace information, increasing the amount of information stored in trace memory and improving performance.

The tracer according to the present embodiment is capable of capturing individual pieces or units of trace information even though storage address information for trace information is not stored in a trace memory, so as to thereby increase the amount of stored trace information.

EMBODIMENT

As shown in FIG. 1, a tracer 20, according to the embodiment of the present invention, includes: trace memory 32, which stores trace information of the program execution status of a processor 10; a trace information compression unit 24, which compresses trace information into a predetermined trace format and cyclically stores the resulting compressed information in the trace memory 32, piece by piece; and an address register 28, which stores the last stored address of the trace memory 32; and the JTAG debugger 12 analyzes the content of the trace memory 32 in an order reverse to the program executed order, searches for a start or end of a trace format, and starts trace analysis therefrom in the program executed order.

In addition, the trace information compression unit 24 may be structured such that trace information in a specific format is stored in the trace memory 32 upon start and completion of a trace operation, or upon start of a trace operation.

The tracer 20, according to the embodiment of the present invention, may be embedded in the processor 10 to be traced as a trace target.

As shown in FIG. 1, the tracer 20 embedded processor 10, includes: a processor core module 14, including a trace information output unit 18; the tracer 20; a debug module 16, which includes a JTAG debugger interface 22; and a main bus 34, which is connected between the processor core module 14 and the debug module 16 via buses 36 and 38.

The processor core module 14 reads in and executes processor instructions. The debug module 16 is connected to an external JTAG debugger 12 via the JTAG debugger interface 22 and a JTAG debug output bus 64, and is controllable by the external JTAG debugger 12 when debugging.

The trace information output unit 18 in the processor core module 14 is connected to the tracer 20 via a trace information output data bus 50. The unit 18 receives information of the instruction execution status of the processor core module 14, and outputs trace information to the tracer 20 in the debug module 16.

As shown in FIG. 1, the tracer 20, includes: the trace information compression unit 24, which includes a compression halting unit 26; an address register 28; a buffer register 30; and the trace memory 32.

Figure 2:
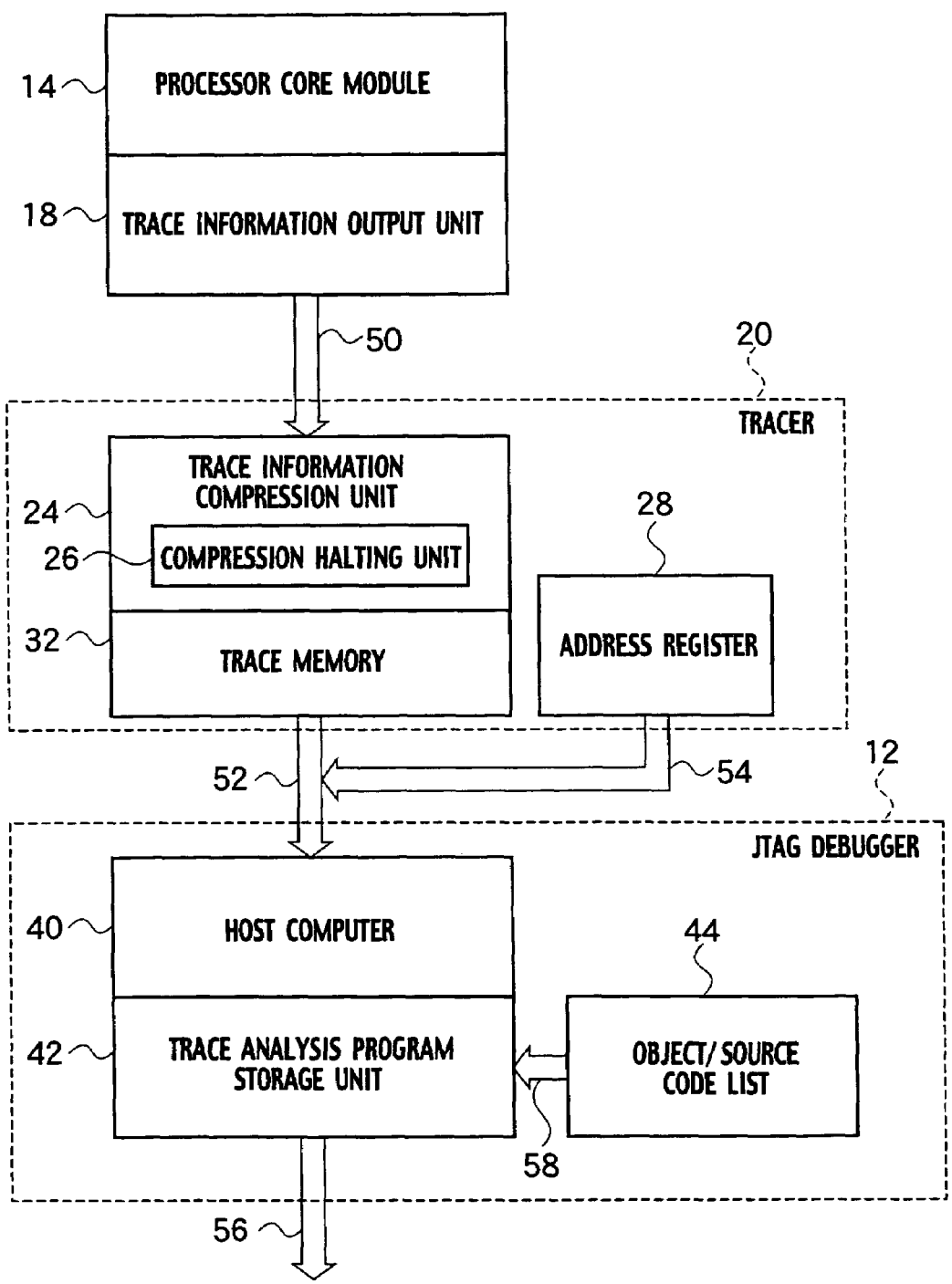
FIG. 2 is a schematic block diagram describing a data flow in a program analysis by the tracer, according to the embodiment of the present invention.

As shown in FIG. 2, the JTAG debugger 12, which analyzes a program executed by the processor core module 14, is connected to a trace memory read-out data bus 52 and a last stored address read-out data bus 54. The debugger 12 includes a host computer 40, which receives trace information, and a trace analysis program storage unit 42, which receives, via a bus 58, an object/source code list 44 of a program being executed.

In a trace operation, the trace information output unit 18 in the processor core module 14, which has executed a program, outputs trace information, including types of instruction, address information, data information, and an operating status of the trace information output unit 18. The tracer 20 then receives the trace information, including types of instruction, address information, data information, and an operating status of the trace information output unit 18. The tracer 20 compresses the trace information that the trace information compression unit 24 has received into data in a format shown in FIG. 3, and then successively stores the resulting compressed information in the trace memory 32.

Once the trace operation is completed, the JTAG debugger 12 reads out, from the tracer 20, the content of the trace memory 32 and the last stored address stored in the address register 28. The debugger 12 stores the object/source code list 44 of a program being executed by the processor core module 14 in the trace analysis program storage unit 42 via the bus 58. The debugger 12 analyzes the content of the trace memory 32 using a trace analysis program, and outputs the program execution status of the processor core module 14 being traced as a trace target.

As shown in FIG. 3, compressed trace information is stored in the trace memory 32 in one of twelve formats. All formats are structured such that the entire format length can be determined by reading out the compressed trace information stored in the trace memory 32 from the lower bits.

FIG. 4 shows how to store trace information when the processor core module 14 executes the following exemplary instruction sequence.

In the following description, 0x0100 on the left side denotes a hexadecimal address 100 in a program memory.

0x0100 add $2, 4

0x0102 sw $3, ($2)

0x0104 jmp $5; The content of Register 5 at this time is assumed to be 0x1000.

$$\vdots \quad \vdots$$
$$\vdots \quad \vdots$$
$$0 \times 0100 \quad \text{add} \quad \$3, 100$$
$$\vdots \quad \vdots$$

Figure 4A:
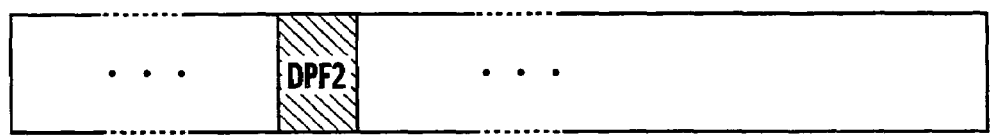
FIG. 4A shows how trace information is stored.
Figure 4B:
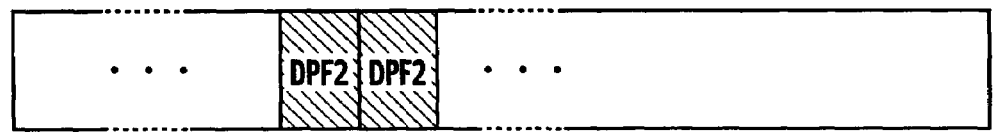
FIG. 4B shows how another trace information is stored.
Figure 4C:
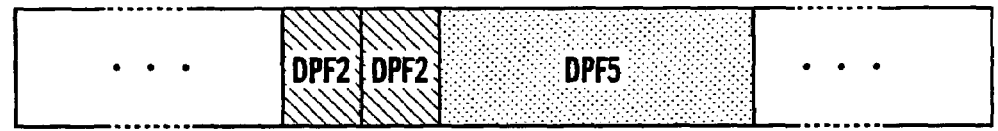
FIG. 4C shows how yet another trace information is stored.

When the processor core module 14 executes an add instruction stored in the address 100, DPF2 is generated as trace information, and then stored as shown in FIG. 4A. Afterwards, when the processor core module 14 executes a sw instruction stored in the address 102, DPF2 is generated as trace information, and then stored as shown in FIG. 4B. Afterwards, when the processor core module 14 executes a jmp instruction stored in the address 104, DPF5 is generated as trace information, and then stored as shown in FIG. 4C. In this manner, the trace information is successively stored in the trace memory 32 in order, from the upper to the lower words, without leaving vacant areas in the memory. In addition, if trace information to be stored is expected to extend over a word boundary, it is divided at the word boundary, and the resulting divided pieces or units of trace information are then stored in successive words, respectively. Furthermore, a word following the last word in the trace memory 32 is controlled to be the next start word in the trace memory 32, which is then cyclically stored with the next trace information.

As shown in FIG. 2, the JTAG debugger 12, which analyzes a program executed by the processor core module 14, is connected to the trace memory read-out data bus 52 and the last stored address read-out data bus 54, and includes the host computer 40, which receives trace information, and the trace analysis program storage unit 42, which receives, via the bus 58, the object/source code list 44 of a program being executed.

The tracer 20, according to the embodiment of the present invention, receives trace information of the flow of a program executed by the processor core module 14 and data update information from the trace information output unit 18, and compresses and converts the trace information into a variable-length trace storage format. The resulting compressed information is stored cyclically in the trace memory 32 in order from the upper to the lower words.

The storage format is structured such that format type and format length can be uniquely determined by reading out the compressed trace information stored in the trace memory 32 from the lower bits.

Since variable-length trace information stored in the trace memory 32 can be accurately captured backward from the time when tracing is completed, using the last stored address after the trace operation is completed, storing data that indicates a trace information stored address in the trace memory 32 is unnecessary, resulting in an increase in the amount of trace information stored in the tracer 20, and improved performance of the tracer 20.

(Trace Operation)

Figure 5:
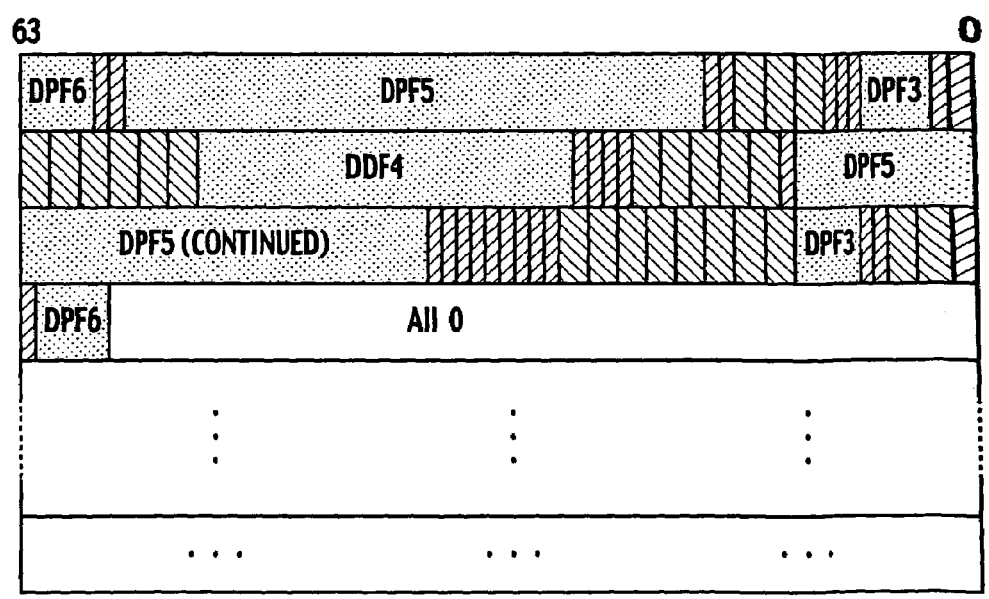
FIG. 5 shows the content of trace memory in which trace information is stored.
Figure 5:
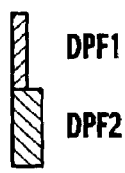

An operation of the tracer 20 is described taking the trace information content stored in the trace memory 32 shown in FIG. 5 as an example.

When a trace operation starts, the tracer 20 generates DPF6, and initializes the address register 28 to zero and the buffer register 30 to zero. Afterwards, tracer 20 stores the DPF6 in the most significant bit of the buffer register 30, and increments the value of the address register 28 by 5 or the DPF6 format length (see DPF6 in FIG. 3).

The bit address of the least significant bit in the 64-bit buffer register 30 is 0 while the bit address of the most significant bit is 63. When the address register 28 points to a bit address in the buffer register 30 or a bit address in the trace memory 32, the lower 6 bits of the address register 28 are inverted and then used. In the following, the description that these inverted outputs are used as an address is omitted. In other words, the lower 6 bits of 0 means the most significant bit or the 63-th bit. On the other hand, the lower 6 bits of 63 means the least significant bit or the 0-th bit.

Afterwards, trace information of an instruction not yet being executed due to a stall cycle is output from the processor core module 14 and then input to the tracer 20. The trace information compression unit 24 then generates and stores DPF1 in an address of the buffer register 30 to which the address register 28 points, and increments the value of the address register 28 by 1 (see DPF1 in FIG. 3)

In the next cycle, similar trace information is output, and DPF1 is then stored in the same manner.

In the next cycle, since trace information of a branch instruction is output from the processor core module 14, the trace information compression unit 24 activates the compression halting unit 26 to generate DPF4 or DPF5. In this case, since the upper 16 bits of a branch destination address differ from those of the instruction execution address, trace information is generated in a DPF5 format. The resulting generated data is stored in an address of the buffer register 30 to which the address register 28 points, and the value of the address register 28 is then incremented by 39 (see DPF5 in FIG. 3).

In the subsequent 8 cycles, compressing trace information, storing the resulting compressed information in an address of the buffer register 30 to which the address register 28 points, and updating the value of the address register 28 are repeated in response to the outputs from the trace information output unit 18 in the processor core module 14.

In the subsequent cycles, information of a branch instruction, which includes a branch destination address that can be statically determined from the program object codes, is output from the trace information output unit 18 in the processor core module 14. The trace information compression unit 24 then compresses the address information, generates and stores DPF3 in an address of the buffer register 30 to which the address register 28 points, and increments the value of the address register 28 by 5 (see DPF3 in FIG. 3).

In the subsequent two cycles, since no instructions are executed by the processor core module 14, DPF1 is stored. In this case, when DPF1 in the second cycle is stored, and the value of the address register 28 is updated, the value of the address register 28, except for the lower 6 bits, is incremented and the lower 6 bits are 0. Therefore, the content of the buffer register 30 is stored in the start word of the trace memory 32, and the buffer register 30 is initialized.

In the next cycle, since trace information of an instruction having a next program execution address which is successively being executed is output from the trace information output unit 18 in the processor core module 14, the trace information compression unit 24 then generates and stores DPF2 in an address of the buffer register 30 to which the lower 6 bits of the address register 28 point, and increments the value of the address register 28 by 2 (see DPF2 in FIG. 3).

In the subsequent five cycles, compressing trace information, storing the resulting compressed information in an address of the buffer register 30 to which the lower 6 bits of the address register 28 point, and then updating the value of the address register 28 are repeated in response to the outputs from the trace information output unit 18 in the processor core module 14.

Since the instruction in the fifth cycle is a Load instruction and data is read out from a predetermined address set in the trace information output unit 18, the trace information compression unit 24 then successively generates DDF4 including 16-bit data information, stores DDF4 including 16-bit data in an address of the buffer register 30 to which the lower 6 bits of the address register 28 point, and increments the value of the address register 28 by 25 (see DDF4 in FIG. 3).

In the subsequent ten cycles, compressing trace information, storing the resulting compressed information in an address of the buffer register 30 to which the lower 6 bits of the address register 28 point, and updating the value of the address register 28 are repeated in response to the outputs from the trace information output unit 18 in the processor core module 14.

In the next cycle, since trace information of a branch instruction is output from the processor core module 14, and the upper 16 bits of a branch destination address differ from the upper 16 bits of the instruction execution address, the trace information compression unit 24 generates and stores trace information in a DPF5 format in an address of the buffer register 30 to which the lower 6 bits of the address register 28 point, and increments the value of the address register 28 by 39 (see DPF5 in FIG. 3). At this time, since the value of the address register 28, except for the lower 6 bits, is incremented and the lower 6 bits are not zero, DPF5 is divided at a bit position which allows storage of the upper bits of DPF5 in the buffer register 30. The trace information in the divided upper bits is stored in the buffer register 30 and also in the second word from the start address of the trace memory 32. The buffer register 30 is then initialized. The value of the divided lower bits in DPF5 is then stored in the buffer register 30.

In the subsequent 23 cycles, compressing trace information, storing the resulting compressed information in an address of the buffer register 30 to which the lower 6 bits of the address register 28 point, and updating the value of the address register 28 are repeated in response to the outputs from the trace information output unit 18 in the processor core module 14. Thus, the value of the address register 28 is increased, except for the lower 6 bits. The lower 6 bits are zero. Therefore, the content of the buffer register 30 is stored in the third word from the start address of the trace memory 32, and the buffer register 30 is then initialized.

In the subsequent cycle, since no instructions are executed by the processor core module 14, DPF1 is stored in the buffer register 30, and the value of the address register 28 is incremented by 1 (see DPF1 in FIG. 3).

When completion of the trace operation is detected, the tracer 20 generates and stores DPF6 in an address of the buffer register 30 to which the address register 28 points, increments the value of the address register 28 by 5, and stores the content of the buffer register 30 in the fourth word from the start address of the trace memory 32 (see DPF6 in FIG. 3).

Figure 6A:
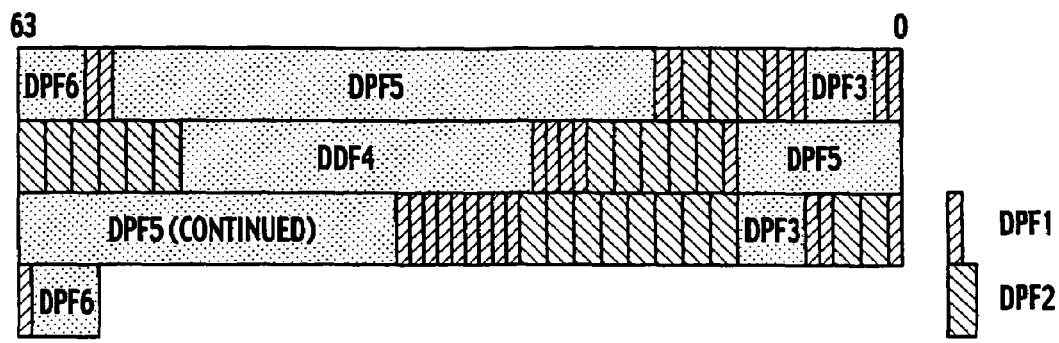
FIG. 6A shows trace information stored in the trace memory.
Figure 6B:
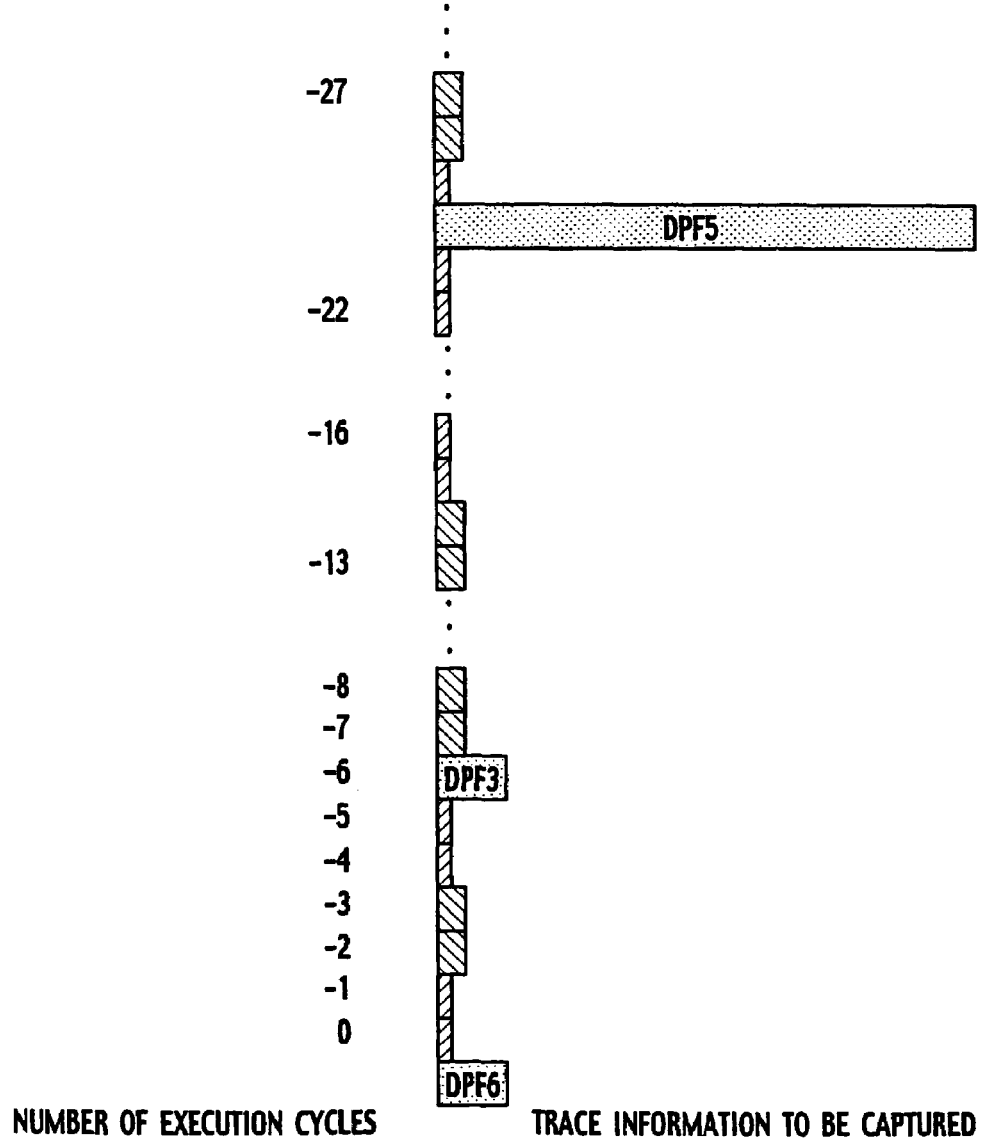
FIG. 6B shows how trace information stored in the trace memory is captured in each cycle.

Although the trace information stored in the trace memory 32 has a variable length, capture of the trace information of each cycle is possible by successively reading the trace memory 32 in the address increasing order from the last stored address and using information of the entire length of the trace information formats, which are indicated by the lower bits of the trace information, to find the next trace information stored address (in a previous execution cycle), as shown in FIGS. 6A and 6B.

In this manner, when capturing trace information from the trace memory 32, if trace information of DPF6 is found, this means that the starting point of the trace operation has been reached. If information of DPF6 cannot be found, even when capturing trace information in the start word of the trace memory 32, this means that the trace memory 32 is cyclically used and that the trace information can be captured from the last word of the trace memory 32.

Since the tracer 20 can accurately capture trace information from the last stored address even when only compressed variable-length trace information is stored in the trace memory 32, storing information of the trace information stored address in the trace memory 32 is unnecessary. Thus, the amount of trace information stored in the trace memory 32 can be increased. Use of the processor 10 with high functionality allows decreased-time development of a processor embedded application system.

As described above, storing data that indicates an information stored address in the trace memory 32 is unnecessary, resulting in an increase in the amount of trace information stored in the tracer 20 and improvement of the performance the tracer 20.

In addition, use of the tracer 20, allows capture of each trace information without storing a trace information stored address in the trace memory 32, resulting in an increase in the amount of trace information stored in the trace memory 32.

Furthermore, use of the tracer 20 embedded in the processor 10 allows capture of trace information of the high-speed processor 10.

FIRST MODIFIED EXAMPLE OF THE EMBODIMENT

According to a tracer of a first modified example of the embodiment of the present invention, a trace information compression unit 24 includes a compression halting unit 26, which halts compression of trace information. Once a trace operation starts or the amount of trace information in a branch destination address information compressed format exceeds a specific capacity, trace information related to a branch instruction may be stored in a branch destination address information non-compressed format. For example, when compressing and storing branch instruction address information in DPF3 or DPF4 (compressing the difference between the lower 15 bits [15:1] of an instruction execution address and the lower 15 bits [15:1] of a branch destination address using address information when the upper 16 bits of the instruction execution address and the upper 16 bits of the branch destination address are the same), if the total amount of stored trace information exceeds a specific value, a branch instruction trace information is not stored in a DPF5 format. Even if requirements for compressing into a DPF3 or a DPF4 format are satisfied, the branch instruction trace information is stored in the DPF5 format.

Such control decreases the amount of stored trace information, but allows storage of an appropriate amount of trace information, even for program analysis through which no DPF5 is generated in the trace memory 32. Provision of the processor 10 with high functionality, allows decreased-time development of a processor embedded application system.

Use of the tracer 20, according to the first modified example of the embodiment of the present invention, allows improved, accurate restoration of a program execution status after compressing branch address information of the program and storing the resulting trace information.

SECOND MODIFIED EXAMPLE OF THE EMBODIMENT

According to a tracer of a second modified example of the embodiment of the present invention, trace information may be limited to that of each instruction executed by the processor 10. For example, not storing trace information when the processor core module 14 does not execute any instructions due to a stall cycle causes loss of information of the number of execution cycles of the processor core module 14. However, such operation allows storage of more trace information of executed instructions of a program in the trace memory 32, and provision of the processor 10 with high functionality, allows shorter-time development of a processor embedded application system.

In addition, according to the tracer of the second modified example, trace information may be limited to that related to a branch instruction executed by the processor 10.

Use of the tracer 20, according to the second modified example and limitation of trace information to that related to instructions executed by the processor core module 14 increases the amount of trace information stored in the trace memory 32.

OTHER EMBODIMENTS

The present invention has been described above according to the embodiment; however, it should not be perceived that descriptions forming part of this disclosure and the drawings are intended to limit the spirit and scope of the present invention. Various alternative embodiments, working examples, and operational techniques will become apparent from this disclosure for those skilled in the art.

In this manner, the present invention naturally includes various embodiments not described herein. Accordingly, the technical scope of the present invention is determined only by specified features of the invention according to appended claims that can be regarded appropriate from the above-mentioned descriptions.

While the present invention is described in accordance with the aforementioned embodiments, it should not be understood that the description and drawings that configure part of this disclosure are to limit the present invention. This disclosure makes clear a variety of alternative embodiments, working examples, and operational techniques for those skilled in the art. Accordingly, the technical scope of the present invention is defined by only the claims that appear appropriate from the above explanation.

Various modifications will become possible for those skilled in the art after receiving the teachings of the present disclosure without departing from the scope thereof.

What is claimed is:

1. A tracer comprising:
a trace memory configured to store trace information of the program execution status of a processor;
a trace information compression unit configured to compress the trace information into a predetermined variable length trace format, and to store the resulting compressed information in the trace memory cyclically piece by piece; and
an address register configured to store the last stored address of the trace memory,
wherein a capture of the trace information of each cycle is executed by successively reading the trace memory in an address increasing order from the last stored address and using information of an entire length of the trace information format, which is indicated by lower bits of the trace information, to find a next trace information stored address in a previous execution cycle.

2. The tracer of claim 1, wherein the content of the trace memory is analyzed in reverse order to a program executed order; and the trace information is stored so that a start or end of the trace format can be searched.

3. The tracer of claim 1, wherein the trace information compression unit is configured to store trace information in a specific format in the trace memory upon start and completion of a trace operation or upon start of a trace operation.

4. The tracer of claim 1, wherein the trace information compression unit further comprises a compression halting unit that halts compression of trace information.

5. The tracer of claim 1, wherein the trace information is limited to that related to each instruction executed by the processor.

6. The tracer of claim 4, wherein once a trace operation starts or the amount of trace information in a branch destination address information compressed format exceeds a specific capacity, the trace information is stored in a branch destination address information non-compressed format.

7. The tracer of claim 5, wherein the trace information is limited to that related to a branch instruction executed by the processor.

8. A processor including a tracer comprising:
a processor core module that includes a trace information output unit and reads in and executes processor instructions;
a debug module that comprises a JTAG debugger interface and a tracer, which includes: a trace memory stored with trace information of the program execution status; a trace information compression unit, which compresses the trace information into a predetermined trace format and cyclically stores the resulting compressed trace information in the trace memory, piece by piece; and an address register, which stores the last stored address of the trace memory; and
a bus connected between the processor core module and the debug module,
wherein a capture of the trace information of each cycle is executed by successively reading the trace memory in the address increasing order from the last stored address and using information of an entire length of the trace information format, which is indicated by lower bits of the trace information, to find a next trace information stored address in a previous execution cycle.

9. The processor of claim 8, wherein the debugger analyzes content of the trace memory in reverse order to a program executed order, and stores the trace information so that a start or end of the trace format can be searched.

10. The processor of claim 8, wherein the debug module is connected to an external JTAG debugger via the JTAG debugger interface and a JTAG debug output bus, and is controllable by the JTAG debugger when debugging.

11. The processor of claim 8, wherein the trace information includes instruction types, address information, data information, and an operating status of the trace information output unit.

12. The processor of claim 8, wherein the trace information compression unit stores trace information in a specific format in the trace memory upon start and completion of a trace operation or upon start of a trace operation.

13. The processor of claim 8, wherein the trace information compression unit further comprises a compression halting unit that halts compression of trace information.

14. The processor of claim 10, wherein the trace information is limited to that related to each instruction executed by the processor.

15. The processor of claim 11, wherein once a trace operation starts or the amount of trace information in a branch destination address information compressed format exceeds a specific capacity, the trace information of a branch instruction is stored in a branch destination address information non-compressed format.

16. The processor of claim 12, wherein the trace information is limited to that related to a branch instruction executed by the processor.

17. A method for operating a tracer comprising:
outputting trace information from a trace information output unit of a processor core module, which has executed a program, and inputting the trace information to a trace information compression unit during a trace operation;
compressing the trace information into a variable-length trace storage format and successively storing the resulting compressed trace information in a trace memory;

reading out content of the trace memory and the last stored address stored in an address register of the tracer by a JTAG debugger after completion of the trace operation, inputting an object/source code list of a program being executed by the processor core module to a trace analysis program storage unit of the JTAG debugger, and analyzing the content of the trace memory using a trace analysis program; and capturing the trace information of each cycle by successively reading the trace memory in the address increasing order from the last stored address and using information of an entire length of the trace information format, which is indicated by lower bits of the trace information, to find a next trace information stored address in a previous execution cycle.

18. The method for operating a tracer, according to claim 17, wherein the storing the trace information in the trace memory is carried out so that the trace information is cyclically stored in the trace memory.

19. The method for operating a tracer according to claim 17, further comprising capturing the trace information stored in the trace memory backward from the time of when tracing has been completed using the last stored address information after the trace operation is completed.

20. The method for operating a tracer, according to claim 17, wherein the analyzing of the content of the trace memory in reverse order to a program executed order, includes searching for a start or end of the trace format, and carrying out trace analysis in the program executed order after all pieces of trace information with respective trace formats have been captured.

* * * * *